(12) United States Patent
Daly et al.

(10) Patent No.: US 6,497,158 B1
(45) Date of Patent: Dec. 24, 2002

(54) PUSH ON SENSOR ATTACHMENT ARRANGEMENT

(75) Inventors: Paul D. Daly, Troy, MI (US); Bruce Harvey, Shelby Township, MI (US)

(73) Assignee: Siemens VDO Automotive Inc., Tilbury (CA)

(*) Notice: Subject to any disclaimer, the term of this patent is extended or adjusted under 35 U.S.C. 154(b) by 0 days.

(21) Appl. No.: 09/568,744

(22) Filed: May 11, 2000

Related U.S. Application Data

(60) Provisional application No. 60/133,713, filed on May 12, 1999.

(51) Int. Cl.$^7$ .................................................. G01P 1/00
(52) U.S. Cl. ...................................................... 73/866.5
(58) Field of Search ............................... 73/866.5, 756, 73/23.31, 23.32; 374/208

(56) References Cited

U.S. PATENT DOCUMENTS

| | | | |
|---|---|---|---|
| 3,178,944 A | * 4/1965 | Templeton | 73/756 |
| 4,662,232 A | * 5/1987 | Gonsalves et al. | 73/866.5 |
| 4,826,379 A | 5/1989 | Norden | 411/366 |
| 4,911,594 A | 3/1990 | Fisher | 411/437 |
| 5,299,447 A | 4/1994 | Caron | 73/3 |
| 5,833,422 A | 11/1998 | Haga et al. | 411/526 |
| 5,897,281 A | 4/1999 | Haga et al. | 411/525 |
| 6,128,967 A | * 10/2000 | Campbell | 73/866.5 |

* cited by examiner

Primary Examiner—Robert Raevis

(57) ABSTRACT

A vehicle sensor assembly includes a retainer which locks the sensor assembly onto a sensor receipt member of a vehicle gas directing component. The retainer is preferably a cup-shaped member having a base and a wall extending substantially perpendicular from the perimeter thereof. Resilient engagement members extend radially inward from the wall toward the base. To install the sensor assembly, the sensor is pressed onto the sensor receipt member such that the engagement members engage the outer surface of the sensor receipt member. Since the retainer is preferably manufactured of a spring steel or a hard resilient plastic such as nylon, the engagement members attempt to return to their free position thereby locking the sensor assembly onto the sensor receipt member. A method for producing the sensor assembly preferably includes locating the sensor body within an initially cup-shaped retainer having a base and an extended wall. The next series of steps include progressively bending the wall toward a central first axis to substantially surround the sensor body with the retainer.

19 Claims, 3 Drawing Sheets

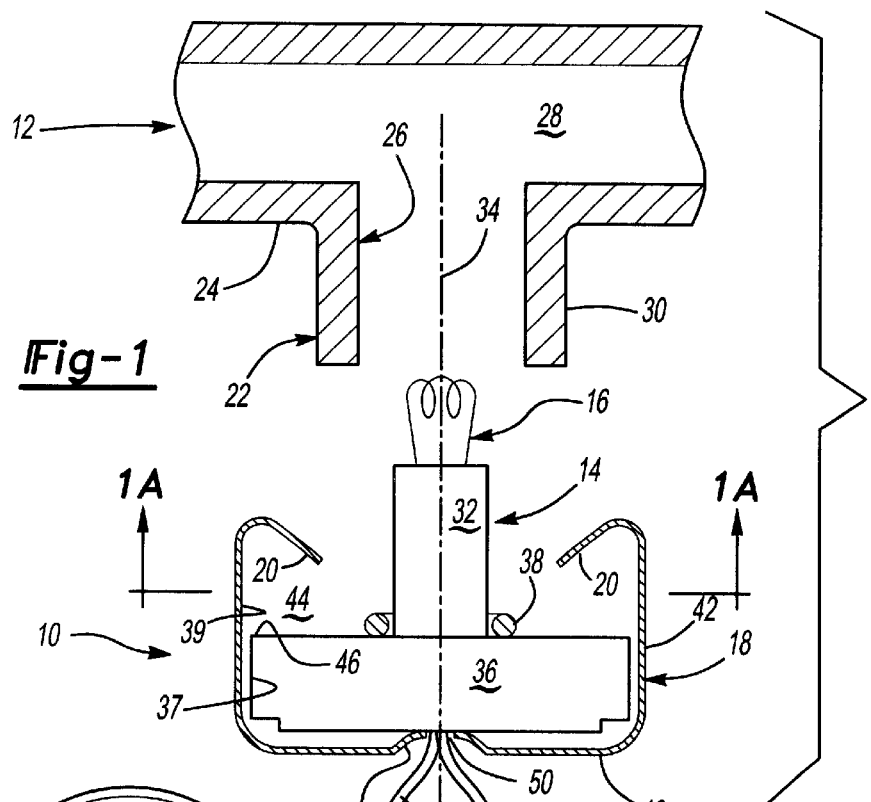
*Fig-1*
*Fig-1A*
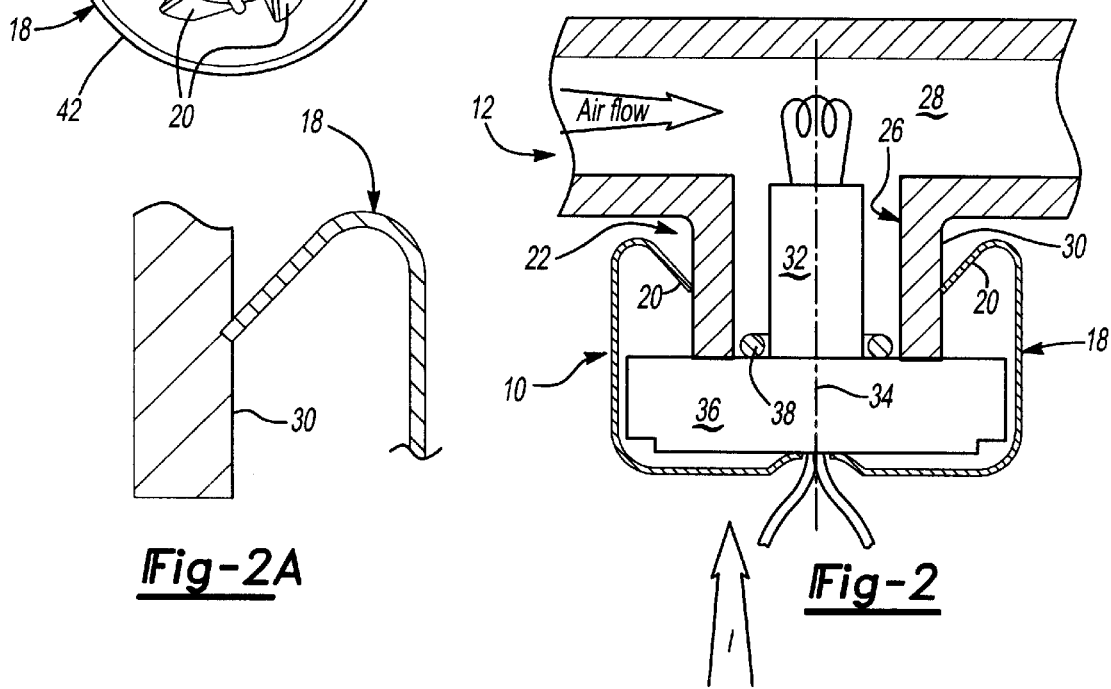
*Fig-2A*
*Fig-2*

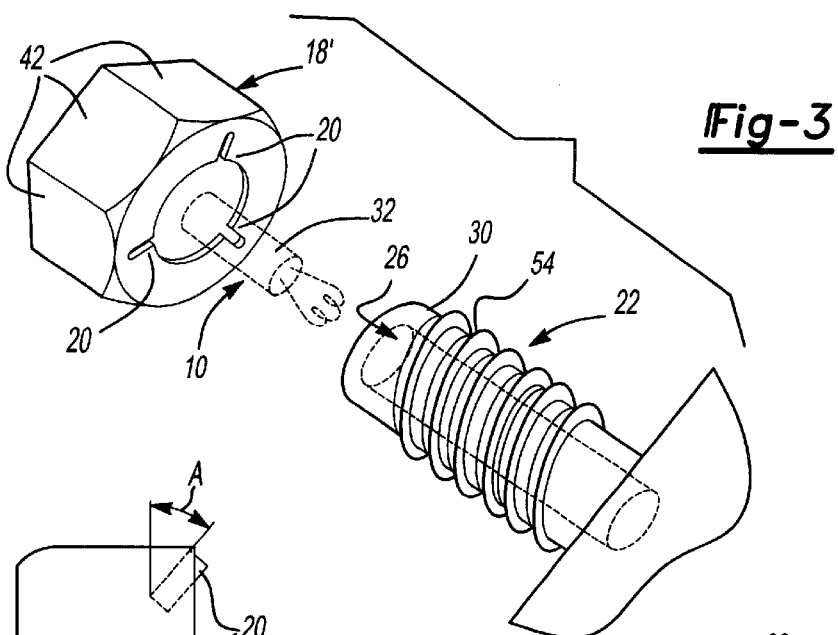
*Fig-3*
*Fig-3A*
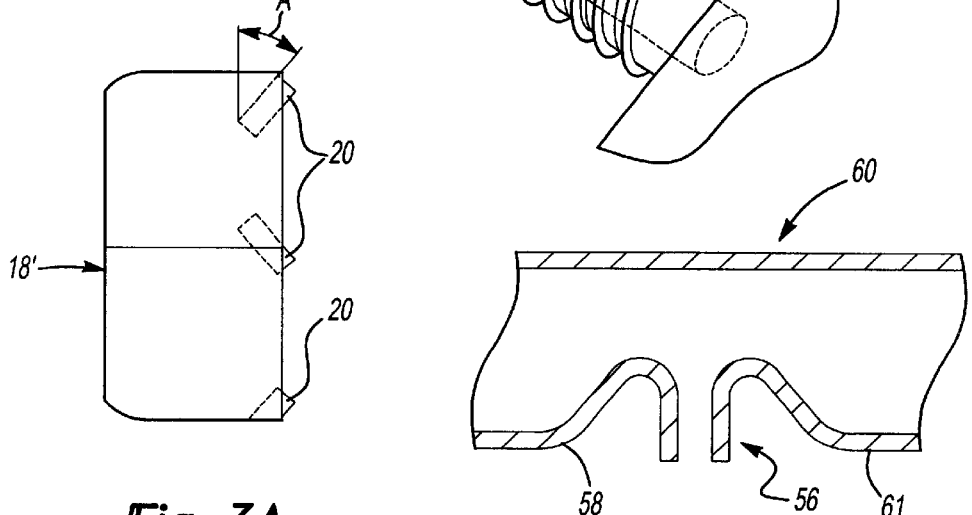
*Fig-4*
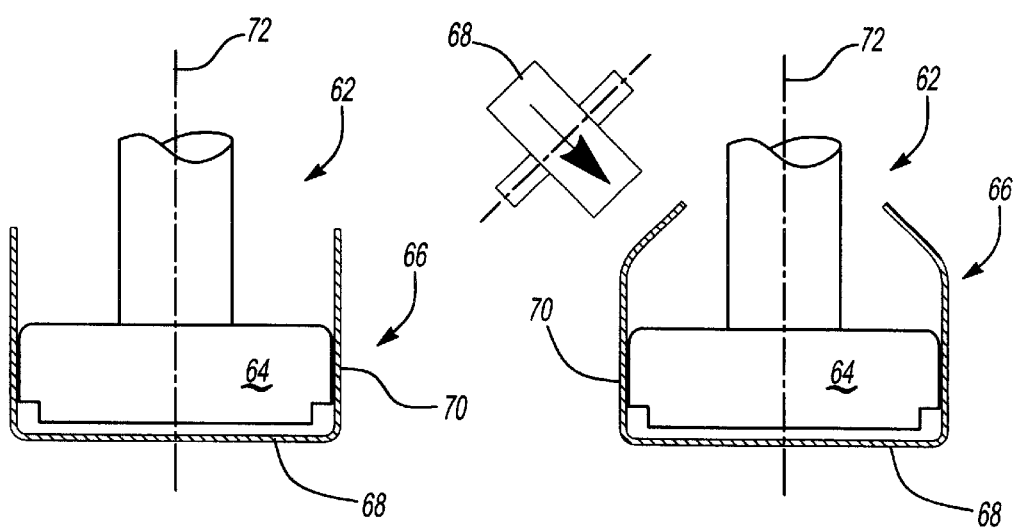
*Fig-5*      *Fig-6*

PUSH ON SENSOR ATTACHMENT ARRANGEMENT

BACKGROUND OF THE INVENTION

The present application claims priority to U.S. Provisional Patent Application Ser. No. 60/133,713, filed May 12, 1999.

The present invention relates to a vehicle sensor, and more particularly to a sensor attachment arrangement for vehicle air induction components.

Various types of air induction components such as air induction manifolds, air filter assemblies and throttle bodies are used in the field of internal combustion engines. Many known air induction components are presently manufactured of a non-metallic material such as nylon to simplify fabrication and reduce weight.

The prevalence of substantially non-metallic air induction components can create difficulties for the installation of sensors such as temperature sensors, manifold absolute pressure (MAP) sensors, mass air flow sensors, potentiometers and the like. Such sensors are commonly threaded directly into apertures in the air induction components. Other sensors include extended tabs which receive threaded fastener that enter the air induction components. However, these common attachment arrangements can create residue stress between the threaded sensor or fastener. During use, the air induction component heats up and the threaded sensor or fastener may tend to relieve the residual stress by moving away from its installed position. The sensor may then shift away from its original position and cause a degradation of performance.

Another known sensor attachment arrangement includes a barb which snaps onto a ledge. However, the known barb and ledge is relatively easy to disengage. A measure of a snap fit is the locking ratio which can be defined as the force to put the snap-fit in, divided by the force to take the snap fit object out. The locking ratio for the known barb arrangement is approximately 1:2. That is, it requires approximately twice as much force to remove the barb as to insert it. A low locking retention ratio is particularly disadvantageous when located adjacent a high-vibration vehicle component.

Known sensor attachment arrangements are also typically unique for each particular sensor. The unique attachment arrangements complicate manufacture of the air induction component and increases the difficulties of substituting sensors for different vehicle and engine types.

Accordingly, it is desirable to provide a sensor assembly which can be easily, securely and inexpensively attached to a non-metallic air induction component without the introduction of residual stress. It is further desirable to provide a generic attachment arrangement to simplify manufacture of the air induction component and allow the interchangeability of sensors.

SUMMARY OF THE INVENTION

The present invention provides a vehicle sensor assembly for a vehicle gas directing component such as an air intake manifold. The sensor assembly includes a retainer which digs into and locks the sensor assembly into a sensor receipt member.

The sensor receipt member is preferably formed into a vehicle gas directing component such as an air intake manifold. The sensor receipt member extends from an external wall of the gas directing component and provides an aperture into the interior of the gas directing component. The sensor receipt member preferably includes a frusto-conical outer surface which receives engagement members of the retainer.

In one disclosed embodiment the retainer is a cup-shaped member having a base and a wall extending substantially perpendicular from the perimeter thereof. A plurality of engagement members extend radially inward from the wall toward the base. The engagement members are therefore located substantially within the interior formed by the geometry of the retainer. Preferably, the sensor body portion can "float" within the retainer. By allowing the sensor body portion to float within the retainer, tolerance variations between the assembled parts are accommodated. To assure that the retainer places a substantially even load on the sensor body portion, a dimple is preferably formed in the center of the retainer base. The dimple faces the interior formed by the geometry of the retainer.

To install the sensor assembly, the sensor body is initially inserted within the aperture. The sensor assembly is then pressed into the sensor receipt member such that the engagement members engage the outer surface of the sensor receipt member. The engagement members provide a resistance toward the center of the sensor receipt member. Thus, since the retainer is preferably manufactured of a spring steel or a hard resilient plastic such as nylon, the engagement members attempt to return to their original position thereby locking the sensor assembly onto the sensor receipt member. Further, particularly when an extraction force is exerted upon the sensor assembly, each engagement member digs into the outer surface of the sensor receipt member.

In one disclosed embodiment, disassembly features are incorporated into the retainer. The engagement members are formed at a helical angle to engage thread-like features formed in the outer surface of the sensor receipt member. The sensor assembly can thereby be pushed on the sensor receipt member yet be easily removed by rotation thereby completing the thread forming. To further assist in removal, the wall of the retainer is preferably fabricated as a polygon to receive a tool or provide improved grip during manual removal.

A method for producing the sensor assembly preferably includes locating the sensor body within an initially cup-shaped retainer having a base and an extended wall. The next series of steps include progressively bending the wall toward a central first axis defined by the sensor body. Although a roller is illustrated in the disclosed embodiment it will be realized that other metal bending operations can be applied according to the present invention to form the retainer.

In yet another alternate embodiment, the sensor assembly includes an integral retainer. The sensor body preferably includes a longitudinal stepped wall that is thermally formed to fashion the engagement members.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general exploded view of a sensor assembly and associated vehicle gas directing component designed according to the present invention;

FIG. 1A is a sectional view illustrating the retainer and engagement members taken along the line 1A—1A in FIG. 1;

FIG. 2 is an assembled view of the sensor assembly of FIG. 1 installed in the associated vehicle gas directing component;

FIG. 2A is an expanded view of an engagement member of the sensor assembly of FIG. 1;

FIG. 3 is an expanded view of an alternate embodiment of a sensor assembly having a disassembly feature designed according to the present invention;

FIG. 3A is an enlarged side view of the retainer illustrating the engagement members designed according to the present invention;

FIG. 4 is a sectional view of a gas directing component;

FIG. 5 is a schematic illustration of a step of the method of manufacture of the present invention;

FIG. 6 is a schematic illustration of a step of the method of manufacture of the present invention;

DETAILED DESCRIPTION OF THE PREFERRED EMBODIMENT

Figure 6A:
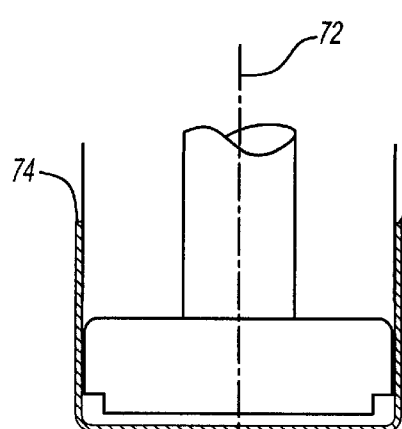
FIG. 6A is a schematic illustration of an alternate step that replaces the steps illustrated in FIG. 5.

FIG. 1 illustrates an exploded view of a vehicle sensor assembly 10 and a vehicle gas directing component 12 such as an air intake manifold. The gas directing component 12 is preferably manufactured of a non-metallic material such as nylon, PET, LCP, PPC, PBT or various other plastics. The sensor assembly 10 includes a sensor body 14 to retain a sensor element 16 such as temperature sensors, manifold absolute pressure (MAP) sensors, mass air flow sensors, potentiometer or other sensor element. As will be further described below, the sensor assembly 10 includes a retainer 18 having a plurality of engagement members 20 which lock the sensor assembly 10 onto the sensor receipt member 22.

The sensor receipt member 22 is preferably formed into the vehicle gas directing component 12 such as an air intake manifold. As illustrated in FIG. 1, the sensor receipt member 22 extends from an external wall 24 of the gas directing component 12 and provides an aperture 26 into the interior 28 of the gas directing component 12. The sensor receipt member 22 preferably includes a frusto-conical outer surface 30 which receive the engagement members 20 of the retainer 18.

The sensor body 14 includes a locating segment 32 which fits within the aperture 26 along a first axis 34. A sensor body portion 36 extends from the locating segment 32 and is preferably fabricated as a cylinder having a diameter greater than the locating segment 32. A seal 38 such as an O-ring is fitted to the locating segment 32. After assembly (FIG. 2), the seal 38 is under compression by the sensor body portion 36 to assure an air-tight fit between the locating segment 34 and the aperture 26. Although a face seal is illustrated, it should be understood that other seal configurations and locations can be used, such as a radial seal about the locating segment 34.

The retainer 18 is preferably a cup-shaped member having a base 40 and a wall 42 extending substantially perpendicular from the perimeter thereof A plurality of engagement members 20 extend radially inward from the wall 42 toward the base 40 (FIG. 1A). The engagement members 18 are therefore located substantially within the interior 44 formed by the geometry of the retainer 18 to engage the outer surface 30. The engagement member 30 define an inner dimension and configuration which is smaller than the outer surface 30. Because the engagement members 18 are manufactured to be resilient they will always attempt to return to their free state position. The engagement members 18, in attempting to return to their free state, will thereby impose a force on the outer surface 30 and "dig-in" into the outer surface 30.

Preferably, the retainer 18 is fabricated to be of a diameter greater than the outer diameter of the sensor body portion 36. A clearance 46 is thereby formed between the outer diameter 37 of the sensor body portion 36 and the inner diameter 39 of the retainer 18. Thus, the sensor body portion 36 can "float" within the retainer 18. By allowing the sensor body portion 36 to float within the retainer 18, tolerance variations between the assembled parts are accommodated.

To assure that the retainer 18 places a substantially even load on the sensor body portion 36 and the seal 38, a dimple 48 is preferably formed in the center of the retainer 18 base 40. The dimple 48 faces the interior 44 formed by the geometry of the retainer 18. In addition, a connector wire aperture 50 is formed within the retainer 18 to allow the sensor 16 connector wires 52 to extend to an associated vehicle component (not shown).

Referring to FIG. 2, the sensor assembly 10 is illustrated in an installed position. To install the sensor assembly 10, the locating segment 32 is initially inserted within the aperture 26. The retainer 18 is then pressed in the direction of arrow I along the first axis 34 such that the engagement members 20 increasing engage the outer surface 30. As the outer surface 30 is preferably of a frusto-conical configuration, the engagement members 20 are forced radially away from the first axis 34. By providing additional force in the direction of arrow I, each engagement member 20 reacts by providing a resistance toward the axis 34 and against the outer surface 30. In other words, since the retainer 18 is preferably manufactured of a spring steel or a hard resilient plastic such as nylon, the engagement members 20 attempt to return to their free state position thereby locking the sensor assembly onto the sensor receipt member.

Particularly when a force is exerted in a direction opposite arrow I, each engagement member 20 digs into the outer surface 30 of the sensor receipt member 22 (FIG. 2A). Preferably, the retainer 18 is manufactured of a harder material then the sensor receipt member 22. The individual engagement members 20 respond as know push-nut type fasteners, and form no part of this invention. Thus, although no tools and only a minimum of force is required to install the sensor assembly 10, a much greater force is required to remove it.

Because of the push-nut type engagement, disassembly features can be incorporated into the retainer 18'. Referring to FIG. 3, the engagement members 20' are formed at a helical angle A (FIG. 3A) to engage a thread 54 formed in the outer surface 30 of the sensor receipt member 22. The sensor assembly 10 locating segment 34 (illustrated in phantom) extends from the retainer 18' to be received within the aperture 26. The retainer 18' can thereby be pushed on the sensor receipt member 22 yet be easily removed by rotation in a known manner. To further assist in removal, the wall 42 of the retainer 18' is preferably fabricated as a polygon to receive a tool or provide improved grip during manual removal.

Referring to FIG. 4, an alternate embodiment of a sensor receipt member 56 is provided. The sensor receipt member 56 extends from an external wall 58 of a gas directing component 60. As illustrated, however, the sensor receipt member 56 is substantially recessed below an outer surface 61 of the gas directing component 60. The sensor receipt member 56 is thereby additionally protected from inadvertent damage.

A method for producing the above mentioned retainer will now be described. However, it should be realized that the use of a sensor assembly is for illustrative purposes only, and that the methodology of the present invention may be applied to other components.

Referring to FIG. 5, a first step in forming a sensor assembly 62 according to the present invention is illustrated. The sensor body 64 is located within a cup-shaped retainer 66 having a base 68 and an extended wall 70. As known, the retainer 66 can be initially formed from a stamping process. As described above, a clearance between the sensor body 64 and the retainer 66 allows drop-in assembly.

FIG. 6 illustrates a second step which includes a first retainer 66 forming operation. Preferably, a roller 68 initiates the bending of the wall 70 toward a first axis 72 of the sensor body 64. Although a roller 68 is illustrated in the disclosed embodiment it will be realized that other metal bending operations can be applied according to the present invention to form the retainer 66. Moreover, a step 74 can be initially formed in the retainer 66' (FIG. 6A) to assist in correctly locating the first bend during the rolling operations.

Figure 7:
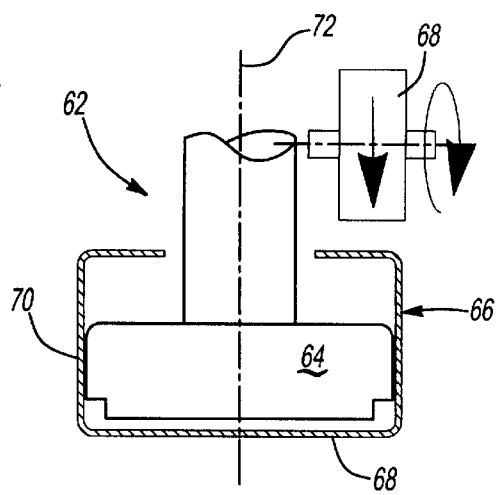
FIG. 7 is a schematic illustration of a step of the method of manufacture of the present invention.
Figure 8:
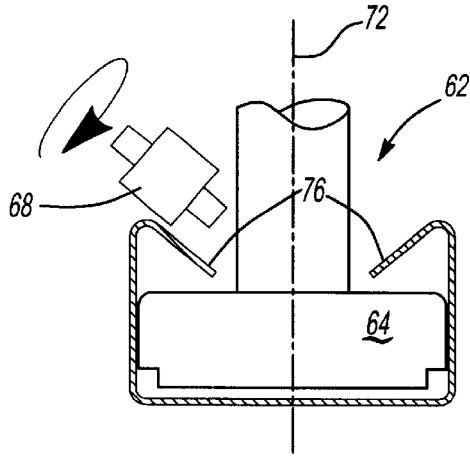
FIG. 8 is a schematic illustration of a step of the method of manufacture of the present invention.

FIG. 7 illustrates a third step which includes continuing the bending of the wall 70 further toward the first axis 72 of the sensor body 64. The roller 68 can be accordingly adjusted relative to the first axis 72A to complete the second bend or a second roller assembly can be used in known assembly line procedures. The retainer 66 now substantially surrounds the sensor body 64. In the final step, illustrated in FIG. 8, the roller 68 finalizes the engagement members 76 position. Although, a four step process is illustrated, this is for exemplary purposes only and the retainer 66 can be formed in more or fewer steps.

Figure 9:
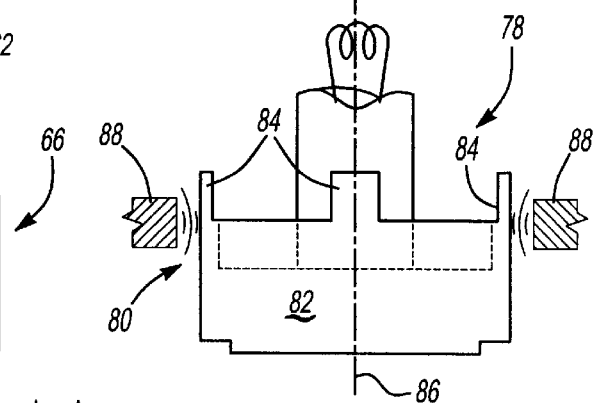
FIG. 9 is a partial phantom view of an alternate embodiment of a sensor assembly designed according to the present invention and to a fist step of an alternative method of manufacture of the present invention.

In the alternate embodiment of FIG. 9, a sensor assembly 78 includes an integral retainer 80. The sensor body 82 initially includes a longitudinal stepped wall 84 which extends along the sensor body first axis 86. The stepped wall 84 is preferably formed integral to the sensor body 82 and represents the first step (FIG. 5) in the above described manufacturing process.

Figure 9A:
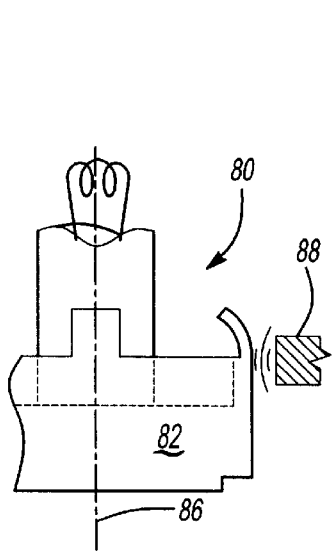
FIG. 9A is an exploded view of the retainer engagement member during the performance of step illustrated in FIG. 9.

Whereas the stepped wall 84 is formed of a non-metallic material, a heater 88 is preferably used to heat the stepped wall 84 for forming. The heater 88 can be a radiant heater, a hot-air blowing device, or some other thermal generating device. Again, the wall 84 is stepped to correctly locate the bend and assist in the forming operation. During heating, the stepped wall 84 tends to bend initially toward the first axis 86 (FIG. 9A). A known tool can be used to assist the bending.

Figure 10:
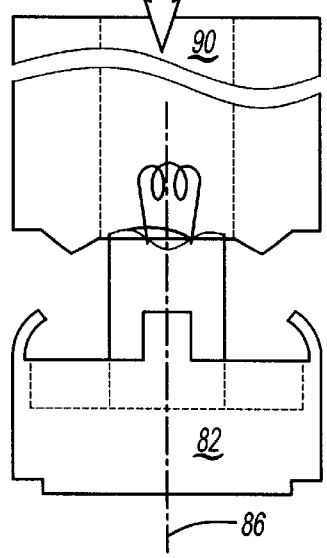
FIG. 10 is a schematic illustration of a step of the method of manufacture of the present invention.
Figure 10A:
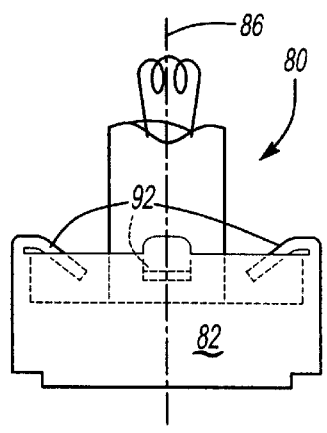
FIG. 10A is an expanded view of a finished component manufactured in accordance with the present invention.

Referring to FIG. 10, a forming die 90 is driven in the direction of arrow F along the first axis 86 after the heating step. When the stepped wall 84 reaches a predetermined temperature, the forming die(s) 90 forms the stepped wall 84 into the final retainer 80 shape. The sensor assembly 78 is therefore provided with an integral retainer 80 having engagement members 92 (FIG. 10A).

The foregoing description is exemplary rather than limiting in nature. Many modifications and variations of the present invention are possible in light of the above teachings. The preferred embodiments of this invention have been disclosed, however, one of ordinary skill in the art would recognize that certain modifications are possible that would come within the scope of this invention. It is, therefore, to be understood that within the scope of the appended claims, the invention may be practiced otherwise than as specifically described. For that reason the following claims should be studied to determine the true scope of protection given for this invention.

What is claimed is:

1. A sensor assembly for a vehicle gas directing component comprising:
    a sensor receipt member having an outer surface and an aperture;
    a sensor body for insertion into said aperture and a sensor body portion; and
    a retainer which substantially surrounds said sensor body portion, said retainer including a base and a plurality of engagement members having teeth extending toward said base, said engagement members having a free state inner periphery dimension which is less than an outer dimension of said outer surface to engage said outer surface of said sensor receipt member.

2. The sensor assembly as recited in claim 1, wherein said engagement members extend toward an interior of said retainer.

3. The sensor assembly as recited in claim 1, wherein said engagement members are resilient.

4. The sensor assembly as recited in claim 1, wherein said engagement members extend at a helical angle toward an interior of said retainer.

5. The sensor assembly as recited in claim 1, wherein said outer surface of said sensor receipt member includes a threaded portion to receive said engagement members.

6. The sensor assembly as recited in claim 1, wherein said retainer is formed of a metallic material.

7. The sensor assembly as recited in claim 1, wherein said retainer is substantially cup-shaped, said sensor body portion floatable within said retainer.

8. The sensor assembly as recited in claim 7, wherein said base includes a substantially central dimple facing said engagement members.

9. The sensor assembly as recited in claim 1, wherein said retainer includes a wall extending substantially perpendicular from said base, said engagement members extending radially inward from said wall.

10. The sensor assembly as recited in claim 9, wherein said wall is formed as a polygon.

11. A sensor assembly for a veicle gas directing component comprising:
    a sensor receipt member having an outer surface and an aperture;
    a sensor body having a locating portion for insertion into said aperture and a sensor body portion; and
    a retainer which substantially surrounds said sensor body portion, said retainer including a base and a wall extending from said base, and a plurality of engagement members having a free state inner periphery dimension which is less than an outer dimension of said outer surface to engage said outer surface of said sensor receipt member, said engagement members extending radially inward from said wall toward said base.

12. The sensor assembly as recited in claim 11, wherein said base includes a substantially central dimple facing toward said engagement members.

13. The sensor assembly as recited in claim 11, wherein said engagement members extend toward an interior of said retainer.

14. The sensor assembly as recited in claim 11, wherein said engagement members extend at a helical angle toward an interior of said retainer.

15. The sensor assembly as recited in claim 11, wherein said outer surface of said sensor receipt member includes a threaded portion to receive said engagement members.

16. The sensor assembly as recited in claim 11, wherein a clearance is provided between said sensor body portion and an interior of said retainer.

17. A sensor assembly for a vehicle gas directing component comprising:

a substantially cup-shaped sensor receipt member having an outer surface and an aperture;

a sensor body for insertion into said aperture and a sensor body portion; and a retainer which substantially surrounds said sensor body portion such that said sensor body portion floats within said retainer, said retainer including a base and a plurality of engagement members extending toward said base, said engagement members having a free state inner periphery dimension which is less than an outer dimension of said outer surface to engage said outer surface of said sensor receipt member.

18. A sensor assembly for a vehicle gas directing component comprising:

a sensor receipt member having an outer surface and an aperture;

a sensor body for insertion into said aperture and a sensor body portion; and a retainer which substantially surrounds said sensor body portion, said retainer including a base and a plurality of engagement members extending toward said base and extending at a helical angle toward an interior of said retainer, said engagement members having a free state inner periphery dimension which is less than an outer dimension of said outer surface to engage said outer surface of said sensor receipt member.

19. A sensor assembly for a vehicle gas directing component comprising:

a sensor receipt member having an outer surface and an aperture, said outer surface of said sensor receipt member includes a threaded portion to receive said engagement members;

a sensor body for insertion into said aperture and a sensor body portion; and a retainer which substantially surrounds said sensor body portion, said retainer including a base and a plurality of engagement members extending toward said base, said engagement members having a free state inner periphery dimension which is less than an outer dimension of said outer surface to engage said threaded portion of said sensor receipt member.

* * * * *